United States Patent [19]

Bockrath

[11] Patent Number: 5,132,394

[45] Date of Patent: * Jul. 21, 1992

[54] FIBER-REINFORCED COMPOSITES COMPRISING AMIDE-IMIDE COPOLYMER MATRIX RESIN

[75] Inventor: Ronald E. Bockrath, Oswego, Ill.

[73] Assignee: Amoco Corporation, Chicago, Ill.

[*] Notice: The portion of the term of this patent subsequent to Nov. 13, 2007 has been disclaimed.

[21] Appl. No.: 398,049

[22] Filed: Aug. 24, 1989

Related U.S. Application Data

[63] Continuation-in-part of Ser. No. 393,389, Aug. 14, 1989, Pat. No. 4,970,292.

[51] Int. Cl.$^5$ .............. C08G 8/02; C08G 12/00; C08G 69/26; C08K 3/40
[52] U.S. Cl. ................... 528/353; 528/125; 528/126; 528/229; 524/494; 524/495; 524/496
[58] Field of Search ............ 524/600, 496, 495; 528/185, 125, 126, 229, 353

[56] References Cited

U.S. PATENT DOCUMENTS

| 4,448,957 | 5/1984 | Nagaoka | 528/351 |
| 4,861,855 | 8/1989 | Bockrath et al. | 528/185 |
| 4,970,292 | 11/1990 | Bockrath et al. | 528/353 |

Primary Examiner—Paul R. Michl
Assistant Examiner—Peter Szekely
Attorney, Agent, or Firm—Richard J. Schlott; William H. Magidson; Robert J. Wagner

[57] ABSTRACT

Composites comprising polyamide-imide matrix resins derived from trimellitic acid compounds and an aromatic diamine are improved in moisture resistance when from 10 to about 90 mole % of the trimellitic acid compounds are replaced by biphenyl tetracarboxylic acid compounds.

5 Claims, No Drawings

FIBER-REINFORCED COMPOSITES COMPRISING AMIDE-IMIDE COPOLYMER MATRIX RESIN

CROSS REFERENCE TO RELATED APPLICATIONS

This application is a continuation-in-part of U.S. application Ser. No. 393,389, filed Aug. 14, 1989, now U.S. Pat. No. 4,970,292.

BACKGROUND OF THE INVENTION

This invention relates to composite materials and more particularly to tough, fiber-reinforced composites having good resistance to moisture. Still more particularly, this invention relates to fiber-reinforced composites comprising amide-imide copolymer matrix resins that exhibit improved water absorption characteristics and retention of mechanical properties after exposure to humid environments.

Fiber-reinforced composites are high strength, high modulus materials which are finding wide acceptance for use in sporting goods and in producing consumer items such as appliances. Such materials are also finding increased acceptability for use as structural components in automotive applications, as components of buildings and in aircraft. Typically, the composites used in structural applications comprise structural fibers in the form of continuous filaments or woven cloth embedded in a thermosetting or thermoplastic matrix. Such composites may exhibit considerable strength and stiffness, and the potential for obtaining significant weight savings makes them highly attractive for use as a metal replacement. However, acceptance of many composite materials for use in extreme environments has been limited by their tendency toward loss in important mechanical properties. This characteristic is particularly noted in composites comprising matrix resin based on condensation polymers such as polyesters, polyimides, polyamides or the like. Such resins tend to absorb moisture, becoming plasticized and losing in rigidity and thermoproperties such as Tg. In addition, where the linking groups are sensitive to hydrolysis, some loss in properties may result by way of hydrolytic degradation of the matrix resin.

The moisture sensitivity of such composites and the resulting inability of such composites to retain useful rigidity, toughness and high temperature properties has been recognized as being a serious problem for many years. The composites industry has long been involved in finding ways to overcome these deficiencies, including through the development and use of thermosetting resins, which tend to be less sensitive to moisture. Considerable effort has also been expended over the past two decades directed toward improving the moisture sensitivity of well-known condensation polymers that have otherwise highly desirable characteristics for use as matrix resins.

Polyamide-imides are condensation polymers finding use in a wide range of applications such as adhesives, molding compositions, fibers, films, composites, laminates, etc., owing to a desirable combination of properties. Torlon ® polyamide-imides, available from Amoco Performance Products, Inc., are examples of commercial polyamide-imides.

Despite the many desirable properties of polyamide-imides, their utility in certain applications has been limited by a tendency to absorb water, leading to loss of mechanical properties on exposure to high temperatures. So-called annealing or post-curing treatments of polyamide-imide or polyamide-amic acid fabricated parts such as are disclosed in commonly assigned U.S. Pat. No. 4,167,620 allow water liberated due to imidization and chain extension reactions as well as absorbed moisture to diffuse out of fabricated parts and may improve retention of mechanical properties. However, since polyamide-imide resins tend to absorb water when exposed to humid environments, these treatments are not sufficient to permit the use of currently available, commercial polyamide-imides in certain demanding applications. It also is known to add certain metal oxides to polyamide-imides to tie up absorbed moisture as well as water liberated during imidization and chain extension reactions to avoid cracking and sacrifices in physical properties. Again, however, this approach does not yield sufficient improvement of presently available materials or prevent subsequent moisture absorption and further reduction in mechanical properties.

Aromatic polyimides typically do not absorb water to as great an extent as polyamide-imides. However, the utility of aromatic polyimides is limited because of their lack of solubility. Further, their high glass transition temperatures ("Tg") make melt processing impractical or impossible.

U.S. Pat. No. 4,017,459, assigned to the Upjohn Company, discloses amide-imide polymers and copolymers prepared from 2,2-bis(4-(p-aminophenoxy)phenyl) propane and trimellitic anhydride halide or from 2,2-bis(4-(p-isocyanatophenoxy)-phenyl) propane and trimellitic acid or anhydride. According to the patent, such polyamide-imides are melt processable, such as by injection molding, and useful in manufacture of articles such as gears, ratchets, clutch linings, bearings, pistons and cams and electrical components. In contrast, the patentee teaches that polyamides prepared from the above-named diamine and isophthalic acid and polyimides prepared from that diamine and pyromellitic acid dianhydride or benzophenone tetracarboxylic acid dianhydride are intractable in the sense of lacking sufficient solubility for solution processing, lacking in melt processability or lacking both.

U.S. Pat. Nos. 4,111,906 and 4,203,922, both assigned to TRW, Inc., disclose that although processability of polyimides can be improved by using the same in predominantly polyamide-amic acid form and imidizing during a final fabrication step, such an approach is disadvantageous because voids in the final products result from water liberated due to the imidization reaction. These patents also state that chemical and thermal stability are improved by preparing polyimides from 2,2-bis(4-(p-aminophenoxy)phenyl) hexafluoropropane. According to the '906 patent, polyimides prepared from this diamine and a dianhydride are useful as coatings, adhesives and as a matrix for laminated glass or graphite structures. Polyimide foams prepared from pyromellitic acid dianhydride or other aromatic tetracarboxylic acid dianhydrides and such diamine in combination with a second aromatic diamine are disclosed in U.S. Pat. No. 4,535,101, assigned to Imi-Tech Corporation. Preparation of polyamides from the above-named diamine and diacids also is disclosed in the '906 patent. The abstracts of both the '906 and '922 patents mention polyamide-imides; however, no additional information is provided.

U.S. Pat. No. 4,340,697, assigned to Toray Industries, Inc., discloses melt processing difficulties with polyamide-imides and purports to remedy the same by blending with polyphenylene sulfide, polyamide, aromatic polyester, polyphenylene ether or a phenoxy resin. According to this patent, polyamide-imides may contain, in addition to a repeating, main structural amide-imide unit, up to 50 mole percent amide or imide units, the latter being introduced into the polymer by replacing a portion of the aromatic tricarboxylic acid component with pyromellitic acid dianhydride or benzophenone tetracarboxylic acid dianhydride.

U.S. Pat. No. 4,599,383, assigned to NTN-Rulon Industries Co., Ltd., discloses compositions having improved water absorption properties containing a polyamide-imide resin in combination with a polyetherimide and a fluoro resin component.

U.S. Pat. No. 4,755,585, assigned to M & T Chemicals, Inc., discloses polyimides, polyamide acids, polyamide-imides, polyesterimides and polyesteramides containing at least 10 mole percent of a reaction product of an aromatic or aliphatic mono- or dianhydride and certain aromatic diamines having an unsubstituted or halogen- or hydrocarbyl-substituted, paraphenylene radical linked by like or different alkylene, alkenylene, sulfide or oxy groups to two unsubstituted or halogen- or hydrocarbyl-substituted, monovalent, aminophenyl radicals provided that the linking groups are not contemporaneously both sulfide or oxy. Such products are said to exhibit improved processing characteristics and thermal stability and to have utility in widespread applications. Two polyamide-imides and films thereof are demonstrated in the examples. Numerous anhydrides, dianhydrides and diamines are named in this publication and mixtures of anhydrides and dianhydrides are mentioned. It is also reported that mixtures of the above-described diamines with other diamines may be used. Interestingly, such other diamines are said to include 2,2-bis(4-(p-aminophenoxy)phenyl) propane and sulfone, although the publication also mentions, with supporting citations, that polyimides prepared from such diamines and dianhydrides are insoluble and that polyamide-imides prepared from such diamines are of uncertain solubility and processability.

Although a considerable effort has been expended to develop improved composites comprising polyamide-imide matrix resin, most of the presently available composite materials based on such resins lack the combination of good processability and reduced moisture sensitivity needed for use in demanding environments. Composite materials and filled molding compounds based on such resins are needed for use in a variety of applications, including sporting goods and under-the-hood automotive applications. In addition, where the compressive strength of composites based on such resins is not reduced or, more preferably, is improved, the composites would find wide acceptance for use in producing structural components for sporting goods, automobiles, buildings and aircraft.

SUMMARY OF THE INVENTION

This invention is directed to improved fiber-reinforced composites comprising amide-imide copolymer matrix resins having improved resistance to the detrimental effects of humid environments, and to a method for improving the retention of mechanical properties at elevated temperatures after exposure to humid environments for such composite materials. More particularly, the improved composites of this invention comprise matrix resin based on conventional amide-imide copolymers derived from at least one trimellitic acid compound and one or more aromatic diamines, the improvement comprising replacing from 10 to 90 mole %, preferably from 30 to 90 mole %, of the trimellitic acid compound with one or more biphenyl tetracarboxylic acid compounds.

The fiber-reinforced compositions of this invention form thermally stable composites and laminates with excellent moisture-resistance that exhibit excellent mechanical properties, and may be used in the form of prepreg to fabricate composite structures and articles with excellent compressive strength.

DESCRIPTION OF THE INVENTION

Briefly, the fiber-reinforced compositions of this invention comprise continuous fiber reinforcement imbedded in an improved polyamide-imide matrix resin.

THE POLYAMIDE-IMIDE MATRIX RESINS

The improved polyamide-imide matrix resins useful in the practice of this invention are polyamide-imide copolymers comprising amide-imide units and imide-imide units, including amic acid precursors thereof. The aforesaid units are derived from a mixture comprising a trimellitic acid component, a biphenyl tetracarboxylic acid component and at least one aromatic diamine, wherein the trimellitic acid component comprises at least one trimellitic acid compound, and the biphenyl tetracarboxylic acid component comprises at least one biphenyl tetracarboxylic acid compound.

The polyamide-imide copolymers will thus comprise polymeric trimellitamide-imide units, including the corresponding amic acid precursor, derived from the trimellitic acid component, and polymeric biphenyl tetracarboxylic di-imide units, including the corresponding amic acid precursors, derived from the biphenyl tetracarboxylic acid component. The mole ratio of units derived from the trimellitic acid component and units derived from the biphenyl tetracarboxylic acid component will be in the range of 1:9 to about 9:1, based on the total moles of such units in the copolymer.

By the term "amic acid precursors" is meant those amic acid units corresponding to the trimellitamide-imide structure, as follows:

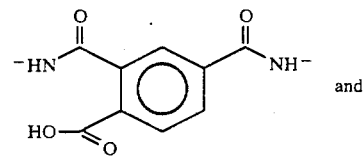

and

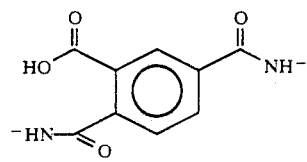

and the amic acid units corresponding to the biphenyl tetracarboxylic di-imide structure, as follows:

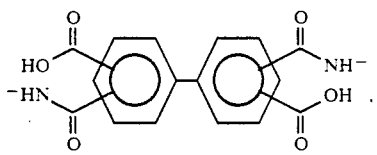

with the proviso that the attachment of each amide linkage is ortho to the carboxylic acid group attached to the same aromatic ring.

Referring to the formulas and the description thereof appearing hereinabove, it will be apparent that the polyamide-imide copolymers useful as matrix resins in the practice of this invention comprise units in which the combination of imide and imidizable amide linkages exceeds other amide linkages. By "imidizable amide linkages" is meant those amide linkages ortho to a carboxylic acid group, which are present in the amic acid components. Typically, during melt processing, annealing or curing treatments or other suitable heating, substantial conversion of such imidizable amide linkages to imide form occurs due to reaction of the ortho-disposed amide and carboxyl groups, such conversion resulting in an excess of imide bonds relative to amide bonds. It may be speculated that the improved hydroscopic properties of these polyamide-imides relative to conventional polyamide-imides, in which essentially equimolar levels of amide and imide linkages are present, are attributable, at least in part, to the reduced level of amide linkages together with the reduced level of total amide and imide linkages for a given molecular weight.

Such polyamide-imides can be prepared by a process comprising reacting, in a nitrogen-containing solvent, a mixture comprising at least one trimellitic acid compound, at least one biphenyl tetracarboxylic acid compound in which each carboxyl group is ortho to one other carboxyl group, and at least one aromatic diamine, the biphenyl tetracarboxylic acid compounds comprising from about 10 to about 90, more preferably from about 30 to about 90 mole % of the total of trimellitic acid component and biphenyl tetracarboxylic acid component of the mixture.

The trimellitic acid component of the mixture comprises trimellitic acid, trimellitic anhydride or its dimer, a trimellitoyl anhydride halide or a combination thereof. Preferably, a combination of 4-trimellitoyl anhydride chloride with trimellitic anhydride is employed because their different reactivities with diamines permit balancing of the proportions of the anhydride and acid chloride relative to each other and to the aromatic tetracarboxylic acid component in such a manner that a high degree of control over polymer inherent viscosities and, accordingly, processability can be achieved. Thus, even in polyamide-imide copolymers in which high levels of biphenyl tetracarboxylic acid component-derived units are present, inherent viscosities well-suited for further processing can be achieved through the use of higher levels of trimellitic anhydride in the trimellitic acid component. Preferably, when using a combination of 4-trimellitoyl anhydride chloride and trimellitic anhydride, the proportion of anhydride ranges from about 2 to about 30 mole based on total moles of trimellitic acid component and biphenyl tetracarboxylic acid component. As biphenyl tetracarboxylic acid component content increases relative to trimellitic acid component content, the proportion of trimellitic anhydride in the combination is preferably increased.

The biphenyl tetracarboxylic acid component has each carboxyl group ortho-disposed with respect to one other carboxyl group. More particularly, suitable examples include 3,3',4,4'-biphenyl tetracarboxylic acid dianhydride, and 2,2',3,3'-biphenyl tetracarboxylic dianhydride. Mixtures can be employed if desired.

The polycarboxylic acid component of the mixture may further comprise minor amounts, up to about 20 mole %, of additional polycarboxylic acid compounds.

The aromatic diamines useful in the practice of this invention will have the formula:

$$H_2N-Ar-NH_2$$

wherein Ar is a mononuclear or polynuclear aromatic radical. Ar may be further characterized as being an aromatic radical selected from the group consisting of mononuclear radicals, such as those represented by the structures

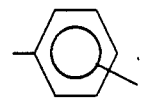

and aromatic radicals comprising a plurality of aromatic carbocyclic radicals interconnected by a carbon-carbon bond or a divalent bridging group, such as those aromatic radicals represented by the structures

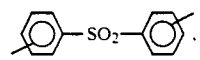

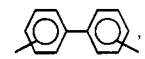

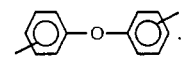

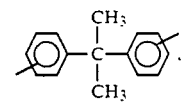

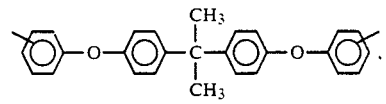

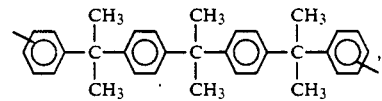

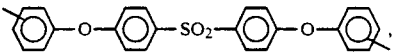

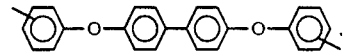

and the like, as well as mixtures thereof.

Suitable diamines include m-phenylenediamine, and p-phenylenediamine, as well as aromatic diamines having a plurality of aromatic rings fused or joined through a stable linkage such as sulfone, oxy-bis-aniline, 4,4'-bis-(aminophenyl) methane, 2,2-bis(4-(p-aminophenoxy) phenyl) propane, 2,2-bis(3,5-dichloro-4-(p-aminophenoxy) phenyl) propane, 2,2-bis(4-(p-aminophenoxy) phenyl) hexafluoropropane, 2,2-bis(4-(p-aminophenoxy) phenyl) hexafluoropropane, 2,2-bis(4-(m-(aminophenoxy)-phenyl) propane, 2,2-bis(4-aminophenoxy) biphenyl, 2,2-bis(4-p-aminophenoxy) phenyl ether, and the like, as well as combinations thereof. Preferably, the diamines will be selected from oxy-bis-aniline, m-phenylene diamine, and mixtures thereof.

As discussed above, the molar ratio of imide plus imidizable amide to amide linkages in the compositions according to this invention is important from the standpoint of product properties. To achieve the desired final product molar ratios, about 10 to about 90 mole % trimellitic acid component and about 90 to about 10 mole % biphenyl tetracarboxylic acid component, based on the total of the trimellitic acid and biphenyl tetracarboxylic acid components, are used. Preferably, these mole percentages are about 70 to about 10 and about 30 to about 90, respectively. More preferably, mole percentages of these components are selected based on intended polymer application as discussed previously.

Preferably, essentially equimolar quantities of diamines and the polycarboxylic acids or their derivatives, e.g., anhydrides, anhydride halides, esters, are employed in preparation of the polyamide-imide copolymer compositions although an excess of either can be employed and may be useful from the standpoint of controlling product properties such as inherent viscosity. It is contemplated to employ in preparation of the polyamide-imide copolymers useful in the practice of this invention minor amounts of acid or diamine components in addition to those described hereinabove to obtain polymeric compositions comprising recurring units as illustrated hereinabove together with minor amounts of other units. Examples of other acid components that can be employed include aliphatic and aromatic diacids such as adipic acid, isophthalic acid, terephthalic acid, 2,6-naphthalene dicarboxylic acid and its esters, phthalic anhydride and the like. Other suitable diamines include sulfonyl(bisaniline), bis-aminophenoxybenzenes, bis-(aminophenoxy)phenyl sulfones, m-toluene diamine, hexamethylene diamine, trimethylhexamethylene diamine, 1,12-diaminododecane and similar diamines of the type conventionally used in preparation of polyamide-imides or polyamides. Combinations of such other acid and diamine components also may be used.

It may also be desirable to include effective amounts, e.g., up to about 10 mole % based on total acid component content, of capping agents such as aniline, phthalic acid, phthalic anhydride or similar monofunctional reagents to provide further control of polyamide-imide molecular weights. Trifunctional or higher polyfunctional reagents such as, for example, trimellitic trichloride or 1,3,5-benzene tricarboxylic acid trichloride can be employed to promote branching.

Usually, reaction of the above-described components is carried out in the presence of a nitrogen-containing, organic, polar solvent such as N-methylpyrrolidone, N,N-dimethylformamide, N,N-dimethylacetamide or combinations thereof. Reaction should be carried out under substantially anhydrous conditions and at a temperature below about 150° C. Most advantageously, the reaction is carried out at about 20° C. to about 70° C.

The reaction time is not critical and depends primarily on the reaction temperature. It can vary from about 1 to about 24 hours, with about 2 to about 4 hours at temperatures of about 30° C. to about 70° C. being preferred when using nitrogen-containing solvents.

As a result of the reaction there is obtained a relatively viscous solution comprising polyamide-imide, typically in predominantly amic acid form, in the reaction solvent. The invented compositions can be recovered from the solution by any suitable means, for example by precipitation with water, and then processed in powder form, pelletized for further processing or re-dissolved in a nitrogen-containing, organic, polar solvent for use in solution processing.

Reaction of components comprising trimellitic acid component, biphenyl tetracarboxylic acid component and diamine component according to this invention also can be conducted stepwise by reacting all or part of one of the acid components with diamine component to form an oligomeric product and subsequently reacting that product with the other acid component and any remaining acid component in one or more additional steps. Preferably, a stoichiometric excess of diamine component is used in relation to the acid component in the first step so that the oligomeric species resulting from the reaction are predominantly amine-terminated and thus capable of further reaction with additional acid component. The first step preferably is conducted in a nitrogen-containing solvent such as identified above at temperatures and for a time sufficient to attain essentially complete reaction of the first acid component with the diamine. More preferably temperatures of about 20° C. to about 60° C. are employed during the reaction. The products of such a step can then be employed in reaction with the remaining acid component substantially as described hereinabove. When using an excess of one of the acid components relative to the other, best results are achieved when the acid component being used in lower proportion is reacted with diamine in a first step and the product thereof is reacted with the acid component being used in higher proportion in a subsequent step.

Preparation of the polyamide-imide copolymers according to this aspect of the invention allows for substantial flexibility in terms of polymer composition in that longer or shorter oligomeric species can be formed, depending on first step component proportions, and incorporated into the final polymer, thereby affording a high degree of control over polymer properties such as Tg. In addition, preparation by this technique yields products with the same end groups that are present in conventional polyamide-imides; accordingly, curing or annealing can be conducted to enhance polymer properties.

Typically, preparation of the polyamide-imide copolymers in either a single or multiple step process yields products having a substantial amic acid content, e.g., in which there is present a substantial content of structures described hereinabove as amic acid precursors. Generally, amic acid content is about 50 to about 100 mole percent based on imidizable groups. Acid titre is a convenient indicator of amic acid content, with values of about 1 to about 3 milliequivalents COOH per gram of polymer indicating a product of significant amic acid content. Conversion of amic acid groups to imide groups can be accomplished by heating, including that conducted during further processing, or chemical means to increase imide content as desired. Conveniently, heating at about 80° C. to about 250° C. is conducted for about 1 to about 20 hours to increase imide content as desired.

The polyamide-imides useful as matrix resins in forming composites according to the practice of this invention exhibit improved moisture resistance, which imparts particularly beneficial property improvements to fiber-filled composites based thereon. More particularly, the composites of this invention, and in particular those composites comprising continuous fiber reinforcement embedded in such matrix resins, exhibit unexpected improvements in hot, wet properties, increasing the acceptability of such composites for use under particularly stringent environmental conditions. Such composites are produced by combining the polyamideimide matrix resin with continuous fiber reinforcement or structural fibers.

THE FIBERS

Suitable fibers may be characterized in general terms as having a tensile strength of greater than 100 kpsi and a tensile modulus of greater than two million psi. Preferably, such fibers have a modulus of at least 8,000,000 psi and are thermally stable to at least 500° F. (260° C.) for at least about ten minutes in order to obtain composites of high strength, the fibers of which resist degradation at temperatures employed in processing, e.g., by compression molding. The term "thermally stable" means the fiber does not emit volatiles to such an extent as to cause voids in the final composite structure.

Examples of fibers useful for the purposes of this invention include carbon fibers, glass fibers and fibers formed of silicon carbide, alumina, titania, boron and the like, as well as fibers formed from organic polymers such as, for example, polyolefins, poly(benzothiazole), polyarylates, poly(benzimidazole), poly(benzoxazole), aromatic polyamides, polyaryl ethers and the like, and may include mixtures comprising two or more such fibers. Preferably, the fibers will be selected from glass fibers, carbon fibers and aromatic polyamide fibers such as the fibers sold by the DuPont Company under the trade name Kevlar. Most preferably, the fibers will be carbon fibers.

For purposes hereof, carbon fibers include graphite fibers as well as amorphous carbon fibers which result after a thermal carbonization or graphitization treatment. Graphite fibers consist substantially of carbon and have a predominant X-ray diffraction pattern characteristic of graphite. Amorphous carbon fibers, on the other hand, are fibers in which the bulk of the fiber weight can be attributed to carbon and which exhibit a predominantly amorphous X-ray diffraction pattern. Graphite fibers generally have a higher Young's modulus than do amorphous carbon fibers an in addition are more highly electrically and thermally conductive. A variety of suitable carbon fibers are readily available from commercial sources, including, for example, THORNEL ® P-50, P-75, P-100 and P-120 grades of pitch-based carbon fiber, as well as T-300, T-500 and T-650/42 grades of polyacrylonitrile-derived carbon fibers available from Amoco Performance Products, Inc.

The fibers may be used in the form of continuous tows of typically from 500 to 420,000 filaments, as continuous unidirectional ribbon or tape, or as nonwoven or woven cloth. Unidirectional ribbon or tape useful in the practice of this invention may comprise a single flat tow of continuous filaments or a plurality of substantially parallel multifilament fiber bundles which are substantially coextensive with the length of the ribbon. In the latter embodiment, the fiber bundles of the ribbon may be provided in a variety of physical configurations. For instance, the bundles of the ribbon may assume the configuration of continuous lengths of multifilament yarns, tows, strands, cables, or similar fibrous assemblages. The multifilament bundles are preferably lengths of a continuous multifilament yarn. The fiber bundles within the ribbon optionally are provided with a twist that tends to improve their handling characteristics. For instance, a twist of about 0.1 to 5 turns per inch, and preferably about 0.3 to 1.0 turns per inch, may be imparted to each fiber bundle. Also, a false twist may be used instead of or in addition to a real twist. Alternatively, the fiber bundles can be without twist.

Multifilament fiber bundles may be provided within the ribbon in a substantially parallel manner in the substantial absence of bundle crossovers to produce a flat ribbon. The number of parallel multifilament bundles present within, for example, a ribbon may be varied widely, e.g., from 6 to 1,000 or more. In one embodiment, a ribbon is selected having a weft pick interlaced with substantially parallel fiber bundles in accordance with the teachings of commonly assigned U.S. Pat. No. 3,818,082, which is herein incorporated by reference. It is not essential, however, that the parallel fiber bundles or the filaments of a flat tow be bound by any form of weft interlacement when constructing fiber tapes for resin impregnation in accordance with the procedures described herein.

Fibrous substrates in the form of woven fabric are provided by weaving fibers on a loom or other suitable apparatus. Generally, any suitable fabric comprising fibers of the type described herein can be employed. Conveniently, a plain weave fabric is employed, although leno, knit, harness and other weaves can be used. Preferably, fibers are coated with a suitable sizing agent, as described further below, before weaving to facilitate the weaving process and avoid or minimize loss of fiber properties.

Nonwoven fabrics also are suitable fibrous substrates although the strength of such fabrics typically is less than that of woven fabrics and unidirectional tapes; accordingly, use of nonwoven fabric substrates is not preferred in applications having rigorous requirements as to strength. For less demanding applications or those in which a nonwoven substrate is used in combination with substrates in other configurations, any suitable nonwoven fabric comprising the above-described fibers can be used. Commercially available nonwoven fabrics often contain a binder that is not compatible with the matrix resin component of the present invention; accordingly, it may be desirable to remove such binder and apply suitable replacement binder, such as a polyamideimide.

Irrespective of the configuration of the fibrous substrate, a sizing material can be applied to the fibers of the substrate to improve adhesion between fibers and the polyamideimide matrix resin. The particular sizing agent to be used is selected based on compatibility with the matrix resin in terms of adhesion and stability relative to the environments to be encountered in preparing and further processing of composites. Examples include various polyamide-imides, polyamide-amic acids and amorphous and semicrystalline polyamides. Preferred sizing agents are polyamide-imides and amic acid precursors thereto prepared from aromatic diamines and trimellitic anhydride or its acyl chloride, as disclosed in European Patent Application No. 85305890.7 published Mar. 26, 1986, and particularly those prepared from trimellitic anhydride or 4-trimellitoyl anhydride chloride or a combination thereof and a combination of oxybis-aniline and meta-phenylenediamine.

Sizing agent can be applied to individual fibers or to multiple fibers, as in bundles, tapes, ribbons or fabrics, by various techniques. For example, fibers can be drawn through a bath containing a solution of the sizing agent or by spraying such a solution onto the fibers and then drying the fibers to substantially remove the solvent. A suitable apparatus for coating the fibers with sizing agent is illustrated in U.S. Pat. No. 3,914,504, which is incorporated herein by reference. Application of sizing agent in molten or softened condition to the fibers also is contemplated, although this technique is subject to limitations in that the high melt viscosity of certain sizing compositions makes substantial wetting of fibers difficult or uneconomical.

It is preferred that sizing agent be applied by passing fibers through a bath containing a solution of the agent in a suitable solvent. This method allows the amount of sizing agent coated onto the fiber to be readily controlled. The presence of solvent improves the ability of the sizing agent to penetrate a staple yarn, filament yarn, tape, fabric or roving, thereby promoting substantial wetting and coating of individual fibers. Concentration of the sizing agent in the solvent is usually in the range of from about 0.05 to about 10 percent, and preferably from about 0.5 to about 5 percent by weight, based on the total weight of the solution.

The solvent used should be capable of dissolving sufficient quantities of the sizing agent to allow efficient coating of the fiber and also be nonreactive with the sizing agent. When using polyamide-imide sizing agent, examples of suitable solvents are N-methylpyrrolidone, N,N-dimethylformamide, methyl ethyl ketone, N,N-dimethylacetamide and mixtures thereof. Other materials to aid in subsequent removal of solvent, such as methylene chloride, can be added to the solvent.

The amount of sizing agent on the fiber will depend on the configuration of the fiber during application, i.e., whether the fiber is in the form of a bundle, fabric or the like. For a continuous fiber or filament, the amount of sizing agent or coating will ordinarily range from about 0.05 to about 1.5 percent by weight based on the fiber. For a tape or ribbon of substantially unidirectional fibers, the amount of sizing agent or coating will ordinarily range from about 0.05 to about 1 percent by weight of the tape or ribbon weight. For a chopped or staple fiber, the amount of sizing agent or coating will ordinarily be less than about 6 percent by weight based on the fiber. A treated fabric will ordinarily contain an amount of sizing agent or coating from about 0.2 to about 1.8 percent by weight based on the fabric weight.

Typically, after application of sizing agent by spraying fibers or passing the same through solution containing the sizing agent, the coated fibers are heated, such as by passage through a heated tube, to remove the solvent and dry the sized fiber. Most conveniently, the tube is heated by hot air. Continuous fiber for woven fabric preferably is sized prior to weaving into fabric.

Commercially available fibers and fabrics often include a sizing agent that is not compatible with the polyamide-imide matrix resin used in forming the fiber-reinforced compositions of this invention. For example, epoxy and polyimide sizes commonly used with commercial carbon or other fibers are not compatible because both emit volatiles at temperatures employed in molding or consolidating the composite compositions according to this invention. Solvent washing, heat-cleaning or other suitable techniques can be conducted for removal of incompatible size from carbon fiber woven fabrics and composite properties are significantly improved due to such removal. Optimum properties, however, are achieved by using unsized fibers and applying to such fibers a sizing agent compatible with the polyamide-imide matrix resin component.

THE COMPOSITES

The fiber-reinforced compositions of this invention, in the form of composite or prepreg, will comprise up to about 80 wt % continuous fiber in the form of woven or nonwoven fabric, unidirectional tape or ribbon embedded in a polyamideimide matrix resin. More preferably, the fiber-reinforced compositions will comprise from about 5 to about 80 wt % continuous fiber, based on combined weight of continuous fiber and matrix resin, and still more preferably the compositions will comprise from 25 to about 75 wt % continuous fiber.

Methods ordinarily used for the production of layered composites may be readily adapted for fabricating the composites of this invention. Most commonly, such composites are formed from impregnated tape comprising uniformly disposed, parallel filaments of continuous fiber, or from resin-impregnated fabric woven from continuous fiber tow. These impregnated fiber structures, designated prepreg, may be produced by impregnating tape or fabric with matrix resin formulation in an uncured state using any convenient method including melt coating, calendaring, dip impregnation with a resin solution or molten resin, melt pressing the tape or fabric into a film of the matrix resin or the like.

The composite will then be formed by laying up sheets or tapes of the prepreg to form a layered stack or lay-up, and curing the lay-up, usually with heat and under pressure. The prepreg layers, each comprising continuous fiber and matrix resin in uncured form, will have their adjoining surfaces adhered upon curing to form a single structure having discrete layers of continuous fiber embedded in an essentially continuous and substantially homogeneous matrix resin phase.

As previously noted, the lay-up and curing steps used in preparing the composite structures will be conventional. These process steps may be carried out using any of the variety of conventional processing devices and equipment and employ such conventional process steps, adaptations and modifications as are ordinarily employed in the composite art.

The above-described fiber-reinforced compositions in the form of layered composites or laminates can be further improved for use in specific applications by employing as matrix resin polyamide-imide copolymers blended, composited or filled with other materials such as additives, particulate fillers and reinforcing materials, other polymeric resins and combinations thereof.

Matrix resins formed by blending the polyamide-imide copolymers with other high performance polymeric products, such as polyarylether sulfones, polyetherimides, polyamides, polyphenylene oxide and other polyarylethers, other polyamide-imides, certain polyimides and polyarylene sulfides or combinations thereof can be performed to tailor composites to requirements for specific applications. Both miscible and immiscible blends are contemplated as is the use of compatibilizing agents to enhance miscibility of otherwise immiscible materials. Typically, immiscible blends contain polyamide-imide copolymer as a dominant polymeric resin component if it is desired that properties attributable to such component dominate blend properties. On the other hand, lesser amounts of such polyamide-imide copolymer can be used to improve or modify properties of other polymers; accordingly, blends containing such other resins as a dominant component also are contemplated. Miscible blends, also referred to as alloys, comprising the polyamide-imide copolymer and one or more additional polymeric resin components in various proportions also can yield desirable results. Usually, blends are prepared by melt blending of the polymeric components, although dry blending and solution blending can also be conducted in lieu of or to facilitate melt blending. Preferably, due to the high viscosity of the invented compositions at temperatures employed in melt blending, a high shear mixer such as a twin-screw extruder is employed for melt blending.

Filled polyamide-imide copolymer compositions comprising particulate or short fiber fillers or reinforcing materials may also be employed as matrix resin in the practice of this invention. Suitable particulate fillers include glass beads, graphite powder, various mineral fillers such as talc, wollastonite and pumice, and resin particles and powders. Suitable short fibers or similar reinforcing materials include glass, carbon, graphite, boron, aramid and other fibers in chopped form. The preferred glass fibers are those made of alkali-free, boron-silicate glass (E-glass) or alkali-containing C-glass, average diameter of the fibers preferably being between about 3 and about 30 microns. Long fibers with an average length of from 5 to 50 millimeters can also be employed. Thermally stable resin particles, fibers and powders having a melt temperature above the temperatures encountered in composite fabrication which are substantially insoluble in the matrix resin and which do not degrade or substantially deform during processing will also be suitable for these purposes.

The continuous fiber-reinforced compositions may comprise up to about 40 weight percent of these additional particulate or fibrous materials or a combination thereof. At the higher levels the high melt viscosity of the matrix resin polymers together with the viscosity-increasing effect of fibers and particulates can make processing difficult, and it may be desirable to use suitable flow-improvers or processing aids.

Filled compositions comprising particulate or fibrous fillers or reinforcing materials embedded in the polyamideimide copolymer matrix resin are also contemplated. Particulate fillers in the form of fiber, beads, flakes, fibrils, whiskers and the like will be suitable, including glass beads, graphite powder, various mineral fillers such as talc, wollastonite and pumice, resin beads and powdered resins. Suitable fibrous fillers or reinforcing materials include glass, carbon, graphite, boron, aramid and other fibers. Compositions intended for use in injection molding applications preferably contain up to about 40 weight percent particulate or fibrous materials or a combination thereof because at higher levels the high melt viscosity of the matrix resin together with the viscosity-increasing effect of fibers and particulates make processing difficult. Higher filler levels, e.g., up to about 60 weight percent, are suitable for molding compounds for compression molding, e.g., chopped fiber molding compositions. Filler levels can be increased through use of suitable flow-improvers or processing aids. For injection molding compositions, preferred glass fibers are those made of alkali-free, boron-silicate glass (E-glass) or alkali-containing C-glass, average diameter of the fibers preferably being between about 3 and about 30 microns. It is possible to use both long fibers with an average length of from 5 to 50 millimeters. In principle, any standard commercial-grade fibers can be used.

The practice of this invention will be better understood through consideration of the following examples, which are offered by way of illustration.

EXAMPLES

Preparation of the Polyamide-imide Matrix Resins

Example 1

A clean dry four-neck round bottom flask equipped with stirrer and fitted with a nitrogen purge assembly was charged with 1 liter of dry N-methyl pyrrolidone (<500 PPM water). To this solvent 140.2 grams (0.70 moles) of oxybis(aniline) (OBA) and 32.4 grams (0.30 moles) of m-phenylenediamine (MPDA) were added and stirred at room temperature (22° C.) until dissolved. A mixture of 88.3 grams (0.30 moles) of biphenyl dianhydride (BPDA) and 10.6 grams (0.055 moles) of trimellitic anhydride (TMA) was then added to the solution over 70 minutes. The mixture was stirred an additional 40 minutes to completely dissolve the monomers; the temperature at the end of that time was 25° C.

To this clear solution were added 135.8 grams (0.645 moles) of solid 4-trimellitoyl anhydride chloride (4-TMAC) over 70 minutes. The temperature increased further to 30° C. The mixture was then stirred another two hours, reaching a viscosity of about 15 poises. The reaction solution was then precipitated by pouring on an excess of distilled water in a Waring blender over a 20 minute period. The solid polymer was recovered by filtration, then dispersed in distilled water, allowed to soak overnight, then collected by filtration. This procedure was repeated eight times with soak times of at least one hour. The filtered polymer was air-dried overnight, then dried in a vacuum oven at 60° C. for approximately 50 hours.

The dried polymer had solids content of 89.8 wt % (determined by heating 1.0 gram of polymer 20 minutes at 260° C.), and an inherent viscosity of 0.32 dl/g, in NMP (0.5%, 25° C.), and an acid titre of 3.64 meq/g.

A sample of dried polymer, cured by heating two hours at 260° C., was compression molded at 343° C. for determination of mechanical properties. The compression molding was done with a press using a circular cavity mold of 5⅞" diameter and 2000 psig pressure applied at 665° F. The part was cooled in the mold and removed from the mold at 250° F.

Example 2

A three-necked 2-liter reaction flask equipped with a stirrer was used to prepare a polymer of 4-TMAC/TMA/BPDA—OBA/MPDA (60/10/30—70/30). The OBA 140 grams (0.7 moles) and MPDA 32.4 grams (0.3 moles) were weighed into the flask. To the flask was added 250 grams of NMP which had been dried over molecular sieves. The flask was warmed to 122° F. and a slurry of BPDA 88.3 grams (0.30 moles) in 120 grams of dried NMP was added slowly to the flask. Stirring was continued overnight. In the morning the BPDA had reacted with the diamines. A solution of TMA 19.2 grams (0.10 moles) was dissolved in 100 grams of NMP and added to the flask. A solution of 4-TMAC 126.3 grams (0.60 moles) in 250 grams of NMP was added to the flask keeping the flask between 90° and 100° F. with cooling water. The reaction solution was warmed to 122° F. for about 45 minutes and the polymer precipitated in a Waring blender with deionized water. The polymer was washed with deionized water as in Example 1.

Examples 3-5

Additional Examples were prepared substantially by following the procedures of Examples 1 and 2.

Example A (Control)

An amide-imide polymer was prepared substantially by the processes of Example 1, but omitting the biphenyl dicarboxylic anhydride component.

Specimens of the Examples and Control Example were prepared for testing by molding 6" disks in a Wabash molding press at a temperature of 700° F. and a pressure of about 3,500 psi. After cooling to about 250° F., the disks were removed from the mold, cooled further, and cut into specimens for testing. Tensile properties were determined following the procedures of ASTM D-638, while moisture takeup was determined be immersing specimens in water at 160° F. to constant weight gain.

The compositions and the properties of the molded polymers are summarized in Table I.

TABLE I

| Ex. No. | 4-TMAC m % | TMA m % | BPDA m % | T. Str. Kpsi | E % | T. Mod Kpsi | $H_2O$ wt % |
|---|---|---|---|---|---|---|---|
| 1 | 64.5 | 5.5 | 30.0 | 17.5 | 4.5 | 536 | (3.4) |
| 2 | 60.0 | 10.0 | 30.0 | 15.3 | 4.3 | 534 | 3.8 |
| 3 | 34.5 | 5.5 | 60.0 | 14.3 | 3.7 | 537 | 3.0 |
| 4 | 30.0 | 10.0 | 60.0 | 13.0 | 3.1 | 529 | 3.1 |
| 5 | 0 | 10.0 | 90.0 | 20.1 | 8.1 | 542 | 2.6 |
| Control Examples | | | | | | | |
| A | 94.5 | 5.5 | 0 | 7.7 | 1.6 | 547 | 4.5 |

Notes: Poly(amide-imide) compositions based on substantially equimolar amounts of diamine and polycarboxylic components, using a 7/3 mole ratio of oxybis(aniline) to m-phenylene diamine as the diamine component, as described in the Examples: 4-TMAC = 4-trimellitoyl anhydride chloride; TMA = trimellitic anhydride; BPDA = 3,3′,4,4′-biphenyl tetracarboxylic acid dianhydride; Properties for compression-molded specimens, as molded; T. Str. = Tensile Strength, T. Mod = Tensile Modulus, $H_2O$ = weight gain, see text for procedures.

In the foregoing Examples 1-5 and the Control Example A, the mechanical properties were determined for as-molded samples, without further heat treatment. Those familiar with high temperature molding resins will recognize that subjecting such resins to further heating in a post-curing operation has been heretofore regarded as desirable in order to attain maximum mechanical properties, and particularly tensile properties. The resin of Control Example A, when subjected to a post-curing operation may attain values of as much as 21 kpsi for tensile strength and 8% for elongation or more. It will be seen from the data presented in Table I for Examples 1-5 that the improved compositions of this invention can attain as-molded mechanical properties that are substantially better than the as-molded properties of the prior art Control A resin; in most circumstances, however, a post-curing operation will further benefit the mechanical properties of such compositions. It is also possible to convert the copolymer of this invention completely to the imide form during resin preparation. The resin will retain sufficient solubility to be used in forming prepreg, and the resulting prepreg will have adequate tack and drape for use in lay-up operations. Composites made in this manner undergo further heating and post-curing steps without the generation of moisture by way of the imidizing reaction, which may be detrimental to composite properties.

It will also be apparent from a consideration of the property data for the Examples set forth in Table I that the incorporation of biphenyl tetracarboxylic anhydride (BPDA) into a polyamide-imide based on trimellitic acid compounds markedly reduces the tendency of such amide-imide resins to absorb moisture. Although the degree of improvement in moisture resistance produced by a particular level of BPDA will be seen to exhibit slight variation depending in part upon the level of trimellitic acid employed, all such resins are substantially improved. However, the incorporation of the biphenyl tetracarboxylic acid component to achieve improved moisture resistance is not detrimental to mechanical properties, and particularly to properties such as modulus that are important for use in composite applications.

An alternative to the use of TMA for attaining control of molecular weight is the use of a monofunctional agent such as an aromatic diamine or the like, and this method will be preferred where long term melt stability is desired. Compositions equivalent with those of Examples 1 and 2, when prepared using a 70/30 ratio of 4-TMAC to BPDA, together with a mixture of amines comprising a 7/3 ratio of oxybis(aniline) to m-phenylene diamine and varying amounts of aniline, exhibit substantially equivalent mechanical properties and moisture resistance upon molding.

Preparation of Fiber-reinforced Compositions

Example 6

The procedure of Example 2 was substantially followed to provide additional quantities of the 60/10/30 resin for preparing composite specimens. Test laminates were prepared by dissolving the resin in N-methyl pyrrolidone at a solids level of about 50 wt % and casting film. The film was used to prepare prepreg by sandwiching a Thornel T650/42 12K uni-tape between two films and passing the structure through a prepreg machine to apply heat and pressure, impregnating the tape and providing a prepreg. The tapes, after drying in an oven to 8% volatiles content, were then laid up and molded in an autoclave using 185 psi.

The laminates, as molded, contained less than 1% solvent and typically had a dry glass transition temperature (Tg) of 268° C. (515° F.) as measured by DSC or by DMA (loss modulus). After saturation with water, laminates typically had a wet Tg of 215° C. (420° F.) as measured by DMA, with a transition in flexural modulus at 200° C. (390° F.).

Example 7

A polymer having a 70/30 TMAC/BPDA mole ratio was prepared using as the amines a mixture of OBA, MPDA and aniline in a mole ratio of 67.55/28.95/7, respectively. A 50 gal reactor was charged with 122 lb of N-methyl pyrrolidone, 45 lb of OBA, 10.42 lb of MPDA and 2.17 lb of aniline. The mixture was stirred to dissolve the diamines, and then a slurry of 29.4 lb of BPDA in 29 lb of N-methyl pyrrolidone was then added to the reactor over a 20 min time period. The reactor temperature rose to 120° F. Stirring was continued 14 hr and then a solution of 49.1 lb of 4 TMAC in 98 lb of N-methyl pyrrolidone was added to the reactor over a three-hour period while cooling the reactor to maintain the temperature below 100° F. The reactor contents were then warmed to 122° F. and held at that temperature for 1 hr. The polymer solution was fed to a Fitz mill and precipitated by combining it with approximately 5 volumes of water. The solid polymer was collected by centrifuging, thoroughly washed with deionized water, and then dried in an air oven at 160° F. for 48 hr.

The neat polymer, when molded and tested as in Examples 1–5, had a tensile strength of 8.1 kpsi, an elongation of 1.8% and a tensile modulus of 511 kpsi, and absorbed 3.8% water.

Laminates were prepared as in Example 6, except that the tape was not oven dried, and had a volatiles content of 21 wt % when laid up into laminates.

The properties of the laminates, together with a control laminate prepared in the same manner using the polymer of Example A, are presented in the following Table II. The Open Hole Compression Strength was determined using 1 in x 3 in coupons cut from 24 ply laminate test panels. The test coupons had a ¼ in hole drilled in the center. The specimen was placed in an Instron Tester, using a fixture with a ½ in unsupported area around the hole. The specimen was then end-loaded to failure, and the load-to-failure recorded. Dry specimens were tested as received, while the moisture-conditioned specimens were immersed in water at 160° F. to 75–80% of weight gains at saturation for 100% humidity before testing.

TABLE II

| COMPOSITE PROPERTIES | Ex. A | Ex. 6 | Ex. 7 |
|---|---|---|---|
| 0° Laminate, 8 plys | | | |
| 0° Compression Strength, (Kpsi) | 203 | 230 | 200 |
| Short Beam Shear Strength, (Kpsi) | 16.6 | 17.0 | — |
| (45°/0°/−45°/90°) Laminate, 24 plies | | | |
| Open Hole Compression Strength, | | | |
| Dry, (Kpsi) | 48.1 | 48.0 | 50 |
| 350° F. Wet, (Kpsi) | 22.3 | 32.0 | 32 |

It will be apparent from a consideration of the test results presented in Table II for the composites of Control Example-A and Examples 6 and 7, that mechanical properties, and particularly the retention of mechanical properties after exposure to moisture and heat, are substantially better for composites of this invention.

The composites of this invention exhibit an excellent balance of mechanical properties, as will be further apparent from the additional data obtained for composites prepared as described in Example 6, presented in the following Tables III and IV.

TABLE III

| COMPOSITE PROPERTIES | |
|---|---|
| 0° Tension, 8 ply laminate | |
| Strength, Kpsi | 380.0 |
| Modulus × 10⁻⁶, psi | 25.0 |
| Strain, % | 1.35 |
| 0° Compression, 8 ply laminate | 230.0 |
| Strength, Kpsi | |
| Short Beam Shear, 15 ply laminate | 17.0 |
| Strength, Kpsi | |
| Double Notch Shear, 15 ply laminate | 11.0 |
| Strength, Kpsi | |
| In-Plain Shear, 16 ply laminate | |
| Strength, Kpsi | 20.0 |
| Modulus × 10⁻⁶, psi | 0.77 |

TABLE IV

| COMPOSITE PROPERTIES | |
|---|---|
| Open Hole Compression Strength, | |
| Dry, Kpsi | 48.0 |
| Wet, Kpsi | 32.0 |
| Open Hole Tension Strength, Kpsi | 67.0 |
| QI Tension Modulus, (× 10⁻⁶), psi | 9.1 |
| QI Compression Modulus (× 10⁻⁶), psi | 9.4 |

Notes: Tests were run on (45°/0°/−45°/90°) 24 ply laminates. OHC wet test carried out at 350° F.; all other tests were run at room temperature.

The composites prepared as in Example 6 were further tested in a variety of fluids. The results are summarized in the following Table V.

TABLE V

| | Weight Gain (%) Immersion (days): | |
|---|---|---|
| Fluid | 1 | 28 |
| Methylene Chloride | 0.22 | 1.25 |
| Methylethyl Ketone | 0.13 | 0.66 |
| Hydraulic Fluid | 0.11 | 0.41 |
| Jet Fuel (JP. 7) | 0.11 | 0.51 |

Additional compositions were prepared for comparison purposes following generally the processes of Examples 1 and 2, but using other dianhydrides in place of biphenyl tetracarboxylic acid dianhydride. A fiber-reinforced resin prepared with 50 mole % benzophenone tetracarboxylic dianhydride was not thermally processable, apparently due to cross-linking, while a similar resin made with diphenyl ether tetracarboxylic acid dianhydride (oxybisphthalic dianhydride) had a substantially reduced modulus value compared with that of the polyamide-imide homopolymer. Resins comprising pyromellitic acid dianhydride also exhibit a lowered modulus and, due to a significant increase in the Tg of the resin, are substantially more difficult to thermally process. It will thus be apparent that biphenyl tetracarboxylic acid compounds are uniquely suited among the commonly available aromatic tetracarboxylic acid compounds for use in the practice of this invention.

The invention will thus be seen to be directed to fiber-reinforced composites comprising amide-imide copolymer matrix resins that exhibit improved water absorption characteristics and retention of mechanical properties at elevated temperatures after exposure to wet environments. The composites of this invention comprise up to about 60 wt % fiber reinforcement, which preferably will be a continuous carbon fiber, and an improved matrix resin based on conventional amide-imide copolymers derived from at least one trimellitic acid compound and one or more aromatic diamines, the improvement comprising replacing from 10 to 90 mole % of the trimellitic acid compound with a biphenyl tetracarboxylic acid compound. Further improvements and variations are possible, as will be readily apparent to those skilled in the art, including the use of fiber surface treatments and processes commonly employed in the production of fiber reinforced compositions, as well as additional reinforcement in the form of fiber or particulate fillers, stabilizing additives, lubricants, flow improving additives, curing aids and the like. Such modifications will be included within the scope of the invention described and disclosed herein, which is defined solely by the claims appended hereto.

I claim:

1. A fiber-reinforced composition comprising from about 5 to about 80 wt % of a reinforcing fiber and a polyamide-imide matrix resin derived from at least one trimellitic acid compound selected from the group consisting of trimellitic acid anhydride and 4-trimellitoyl anhydride chloride. 3,3'4,4'-biphenyl tetracarboxylic acid dianhydride and at least one aromatic diamine selected from the group consisting of oxy-bisaniline and m-phenylene diamine, said trimellitic acid compound and said biphenyl tetracarboxylic acid anhydride being present in a mole ratio of from about 3:7 to about 9:1.

2. The fiber-reinforced composition of claim 1 wherein said reinforcing fiber is carbon fiber.

3. In a composite composition comprising reinforcing fibers. a polyamide-imide matrix resin derived from trimellitic acid compounds and at least one aromatic diamine; and, optionally, fillers, flow improvers and thermoplastic resins, the improvement wherein said matrix resin comprises trimellitic acid compounds and biphenyl tetracarboxylic acid anhydride in a mole ratio of from about 3:7 to about 9:1.

4. The composite composition of claim 3 wherein said biphenyl tetracarboxylic acid anhydride are 3,3'4,4'-biphenyl tetracarboxylic acid anhydride.

5. The improved composition of claim 3, wherein the said aromatic diamine is selected from the group consisting of oxybisaniline and m-phenylene diamine.

* * * * *